(12) United States Patent
Takahashi

(10) Patent No.: US 7,380,569 B2
(45) Date of Patent: Jun. 3, 2008

(54) VALVE BODY FOR BACKFLOW PREVENTION VALVE

(75) Inventor: Hideaki Takahashi, Yokohama (JP)

(73) Assignee: Nifco Inc., Yokohama (JP)

( * ) Notice: Subject to any disclaimer, the term of this patent is extended or adjusted under 35 U.S.C. 154(b) by 444 days.

(21) Appl. No.: 10/986,873

(22) Filed: Nov. 15, 2004

(65) Prior Publication Data
US 2005/0103385 A1    May 19, 2005

(30) Foreign Application Priority Data
Nov. 19, 2003    (JP)    ............................... 2003-389424

(51) Int. Cl.
*F16K 15/02*    (2006.01)
*B60K 15/04*    (2006.01)
(52) U.S. Cl. .................. 137/516.29; 137/538
(58) Field of Classification Search ........... 137/516.29, 137/538, 540; 251/357
See application file for complete search history.

(56) References Cited

U.S. PATENT DOCUMENTS

| | | | | |
|---|---|---|---|---|
| 2,260,381 A | * | 10/1941 | Kennon | ................. 137/516.29 |
| 2,329,576 A | * | 9/1943 | Anderson | ............... 137/516.29 |
| 3,409,039 A | * | 11/1968 | Griffin | .................... 137/516.29 |
| 3,456,686 A | * | 7/1969 | Kemble et al. | ............. 137/540 |
| 4,076,212 A | | 2/1978 | Leman | |
| 4,881,570 A | | 11/1989 | Ziebach et al. | |
| 6,340,031 B1 | * | 1/2002 | Matsumoto et al. | ... 137/516.29 |
| 2003/0079776 A1 | | 5/2003 | Ishitoya | |
| 2004/0000342 A1 | * | 1/2004 | Takahashi | ................... 137/538 |

FOREIGN PATENT DOCUMENTS

| | | |
|---|---|---|
| DE | 1910451 | 9/1970 |
| JP | 2000-16099 | 1/2000 |
| NL | 1020775 | 12/2003 |

* cited by examiner

*Primary Examiner*—John Rivell
(74) *Attorney, Agent, or Firm*—Manabu Kanesaka

(57) ABSTRACT

A valve body main unit has a circular step surface facing a circular valve seat surface of a valve chamber formed on a terminal end part of a fuel supply path to a fuel tank and a circular groove with one groove wall extending from the circular step surface, and is normally urged in a direction of closing an inflow port surrounded by the circular valve seat surface. The valve body main unit also has an elastic seal body with a ring shape inserted into the circular groove of the valve body main unit. The elastic seal body has a circular fin-shaped part projecting from an outer perimeter part and pushed against the circular valve seat surface by the urging of the valve body main unit to close the valve.

10 Claims, 19 Drawing Sheets

VALVE BODY FOR BACKFLOW PREVENTION VALVE

BACKGROUND OF THE INVENTION AND RELATED ART STATEMENT

The invention relates to a valve body used for a backflow prevention valve. The backflow prevention valve is provided at a terminal end part of a fuel supply path for delivering fuel into a fuel tank, and functions so that during delivery of fuel from the fuel supply path, a valve is opened by a flow pressure of the delivered fuel to allow the fuel to flow into the fuel tank, and during non-delivery of fuel, the valve is closed to block the fuel inside the fuel tank from flowing back into the fuel supply path.

As a backflow prevention valve for a filler pipe of a fuel tank, there is one disclosed in Patent Document 1. The prevention valve has a structure in which a seal member having a lip part seated in a valve seat part of a valve body is held between a main body member and a spring bearing member. There are several drawbacks in the prevention valve. First, the number of constituent parts is large and the assembly work takes time correspondingly. Second, depending on dimensional accuracy of the main body member and the spring bearing member, the seal member may deform in a wave shape, thereby making it difficult to properly position the lip part in the valve seat part. Third, it is necessary to pay attention to the seal quality between the seal member and the spring bearing member, in addition to the seal quality between the main body member and the seal member.

Patent Document 1: Japanese Patent Publication (Kokai) No. 2000-16099

In view of the problems described above, an object of the present invention is to provide a valve body for a backflow prevention valve that can be constructed suitably with the minimum number of parts.

Further objects and advantages of the invention will be apparent from the flowing description of the invention.

SUMMARY OF THE INVENTION

In order to solve the aforementioned problems, according to the present invention, a valve body for a backflow prevention valve includes features (1) to (3) as follows:

(1) a valve body main unit having a circular step surface facing a circular valve seat surface of a valve chamber formed on a terminal end part of a fuel supply path to a fuel tank and a circular groove with one groove wall extending from the circular step surface, and normally urged in a direction of closing an inflow port surrounded by the circular valve seat surface; and (2) an elastic seal body with a ring shape inserted into the circular groove of the valve body main unit, and having a circular fin-shaped part projecting from an outer perimeter part thereof above the circular step surface, (3) wherein the circular fin-shaped part is pushed against the circular valve seat surface by the urging of the valve body main unit so as to close the valve and block backflow of fuel.

With such a structure, it is easy to assemble the valve body, which pushes the circular fin-shaped part of the elastic seal body against the circular valve seat surface to close the valve. Also, because the elastic seal body is inserted into the circular groove of the valve body main unit, high seal quality between the elastic seal body and the valve body main unit can be assured. Further, there is no part that may have a possibility of allowing leakage of fuel at other parts of the valve body. Furthermore, because the circular fin-shaped part projects from the outer perimeter part of the elastic seal body inserted into the circular groove, the fin tip of the circular fin-shaped part is pushed against the circular valve seat surface on the same level to the extent possible regardless of the position.

The elastic seal body has a short cylindrical part inserted into the circular groove of the valve body main unit, and is formed such that the circular fin-shaped part projects from an outer perimeter part of the cylindrical part. The elastic seal body also has a circular support fin-shaped part on a side opposite to a side facing the circular valve seat surface of the circular fin-shaped part. The elastic seal body may be constructed such that a length between one cylinder end of the cylindrical part contacting the other groove wall upon inserted and a fin tip of the circular support fin-shaped part along a direction of movement of the valve body becomes greater than a length between the other groove wall of the circular groove and the circular step surface along the direction of movement of the valve body.

With such a structure, the elastic seal body inserted into the circular groove of the valve body main unit is assembled onto the valve body main unit, in a state in which one cylinder end of the cylindrical part is elastically pushed against the other groove wall of the circular groove, and the circular support fin-shaped part is elastically pushed against the circular step surface. Accordingly, it is possible to obtain high seal quality with the valve body main unit at the two places elastically pushed against in this manner. Also, because the circular support fin-shaped part is situated between the circular fin-shaped part and the circular step surface and supports the circular fin-shaped part, and because the circular support fin-shaped part itself also is elastically deformed, even if the degree of flatness of the circular step surface is not assured highly, a small variation in levels of the circular step surface can be absorbed by the circular support fin-shaped part. Accordingly, the fin tip of the circular fin-shaped part is pushed against the circular valve seat surface on the same level to the extent possible regardless of a position.

It may be structured such that the elastic seal body has an inside edge part inserted into the circular groove of the valve body main unit and an outside edge part supported on a top of the circular step surface, and the circular fin-shaped part is formed to project from the outside edge part. Further, the elastic seal body may be structured such that a length between a corner part of the inside edge part contacting the other groove wall upon inserted and a corner part of the outside edge part contacting the circular step surface along a direction of movement of the valve body becomes greater than a length between the other groove wall of the circular groove and the circular step surface along the direction of movement of the valve body.

With such a structure, the elastic seal body inserted into the circular groove of the valve body main unit is assembled onto the valve body main unit, in a state in which the corner part of the inside edge part is elastically pushed against the other groove wall of the circular groove and the corner part of the outside edge part is elastically pushed against the circular step surface. Accordingly, it is possible to obtain high seal quality with the valve body main unit at two places elastically pushed against in this manner, in addition to the seal between the inside edge part and the groove bottom of the circular groove. Also, the elastic seal body inserted into the circular groove in this manner accumulates a recoil force in a direction of pulling the circular fin-shaped part off from the circular valve seat surface respectively at the corner part of the inside edge part and the corner part of the outside edge part. Accordingly, when a force in a direction opposite to the direction of the accumulated recoil force is applied to the elastic seal body with the circular fin-shaped part seated in the circular valve seat surface when the valve body is pushed inwardly in an opening direction by fuel supplied from the closed state, it is possible to always position the elastic seal body at a predetermined position with the accumulated recoil force even under an action of the force.

It may be structured such that the circular fin-shaped part of the elastic seal body projects in an inclined manner so as to gradually move away from a central line of movement of the valve body toward the fin tip.

With such a structure, when the valve is closed, that is, in a state in which the circular fin-shaped part is pushed against the circular valve seat surface and the inflow port is closed fluid-tightly, and when the internal pressure on a side of the fuel tank rises and a pressing force from the side of the fuel tank is applied on the circular fin-shaped part, the circular fin-shaped part does not deform in a direction that a projecting direction of the circular fin-shaped part is aligned with a direction parallel to the central line of movement of the valve body, thereby stably securing the seal quality of the closed valve.

According to the invention, the valve body constituting the backflow prevention valve can be constructed suitably with the minimum number of parts.

DETAILED DESCRIPTION OF PREFERRED EMBODIMENTS

Hereunder, embodiments of the present invention will be explained with reference to FIGS. 1 to 23.

Figure 1:
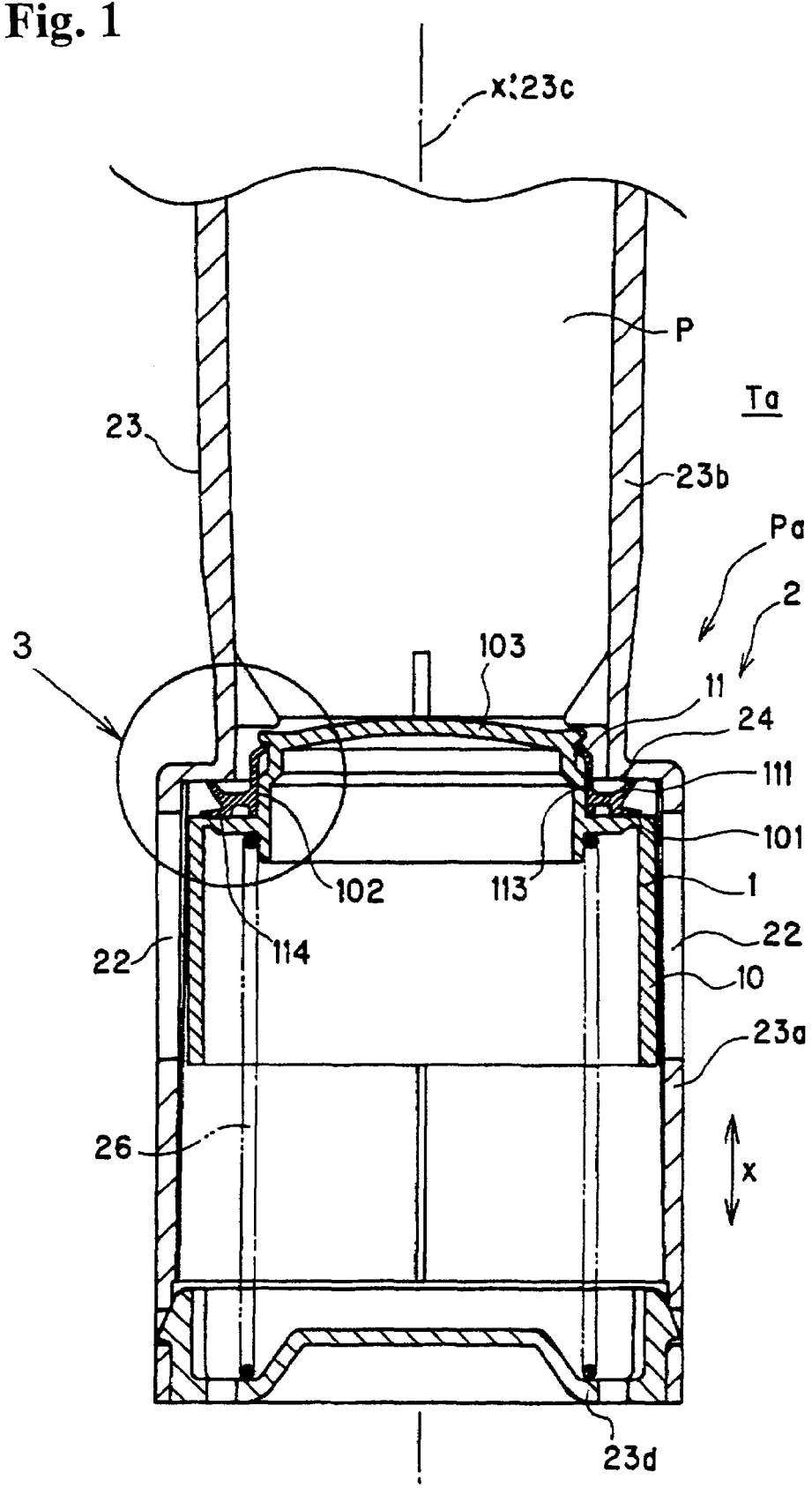
FIG. 1 is a sectional view showing a valve body in use.
Figure 2:
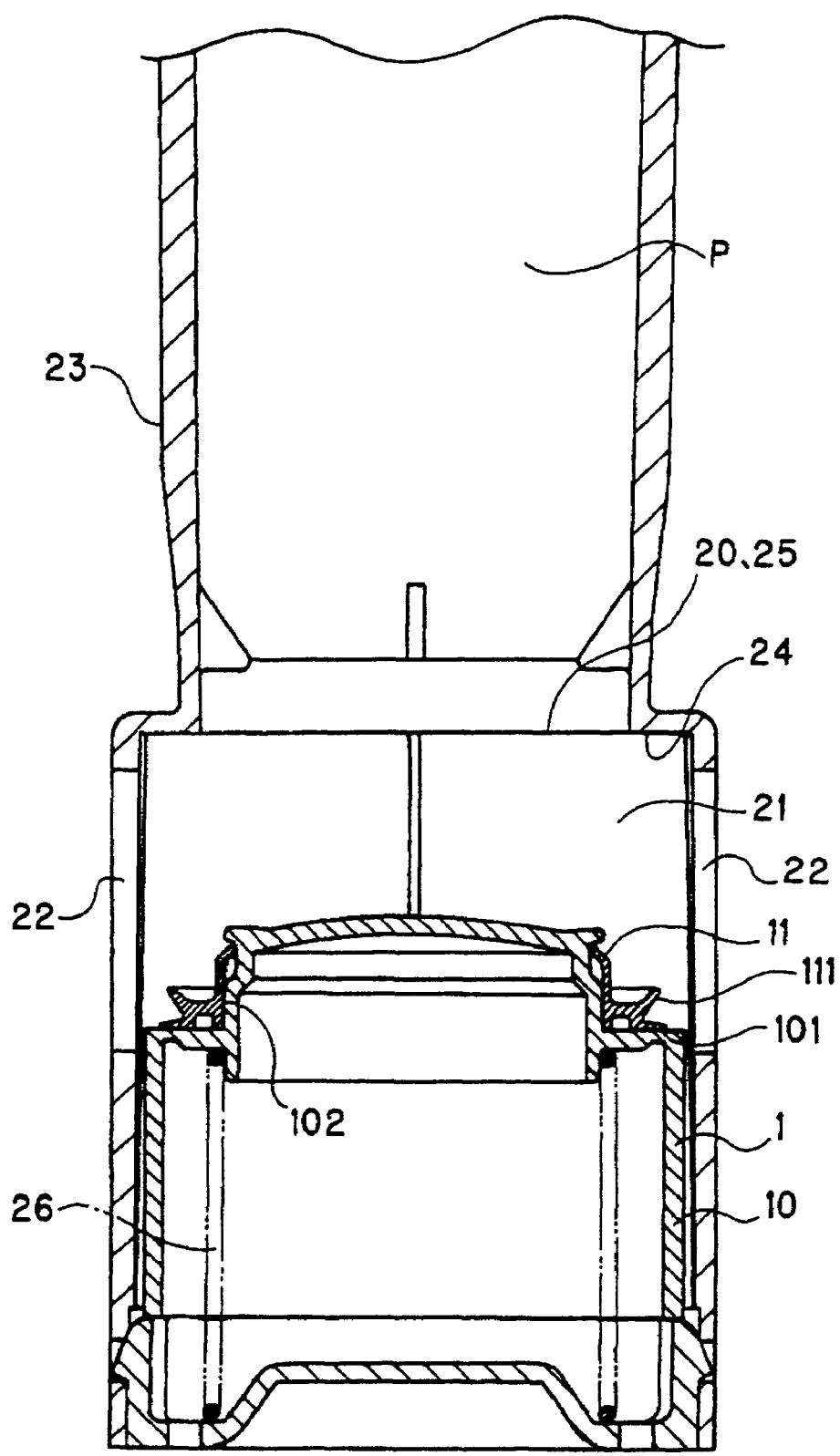
FIG. 2 is a sectional view showing the valve body in use.
Figure 3:
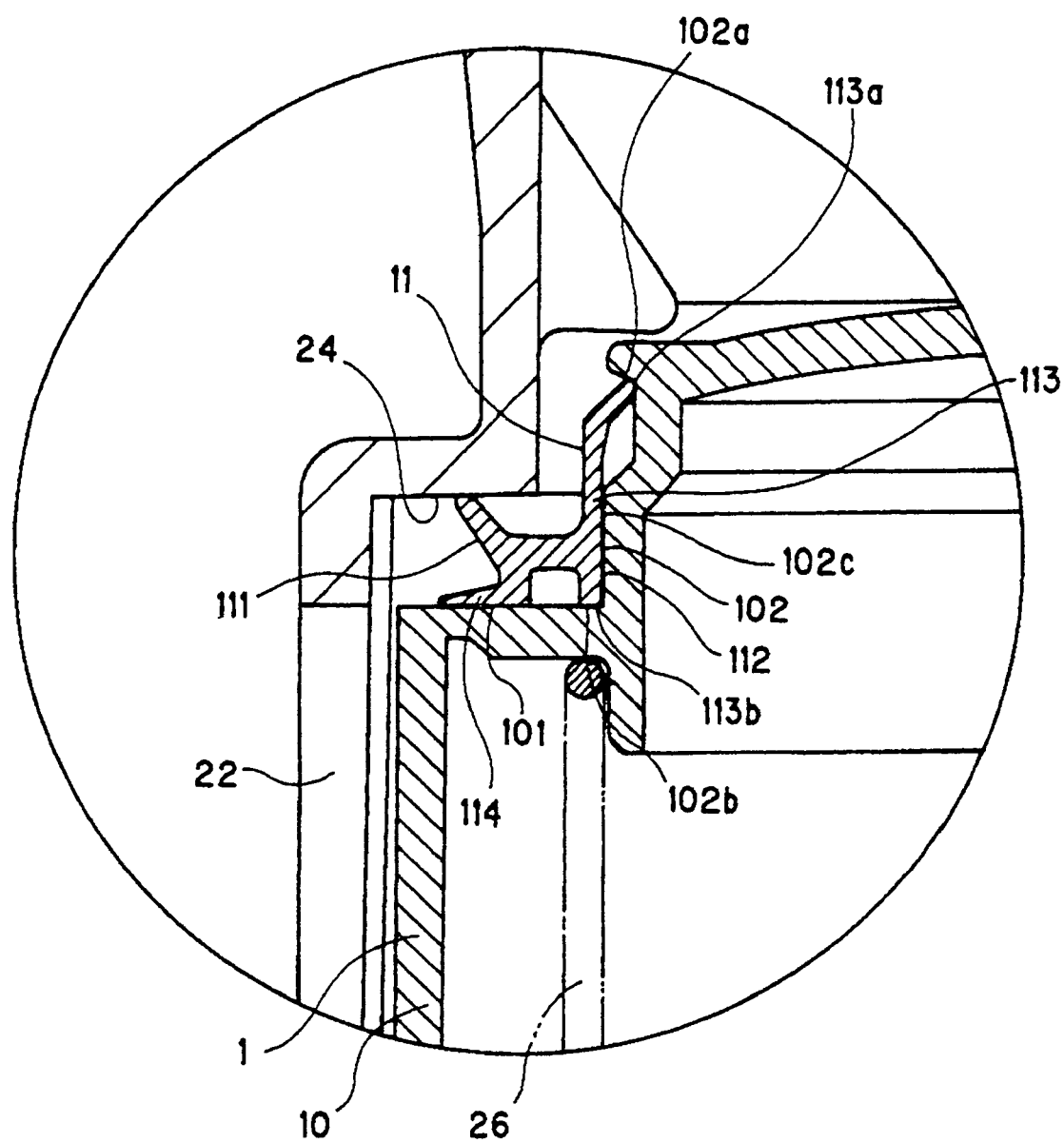
FIG. 3 is an enlarged sectional view of a part shown in FIG. 1.
Figure 4:
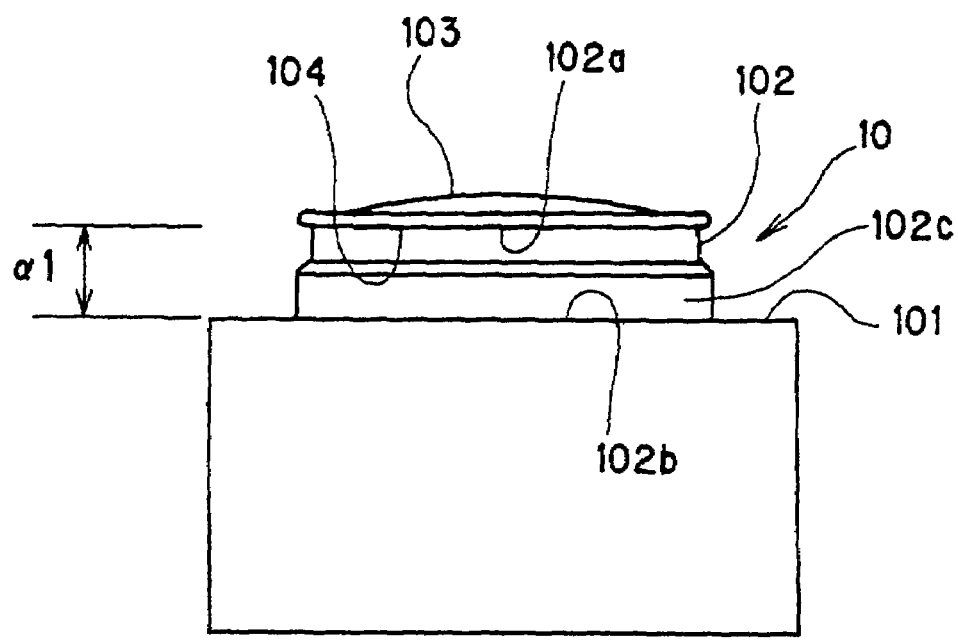
FIG. 4 is a front view of the valve body.
Figure 5:
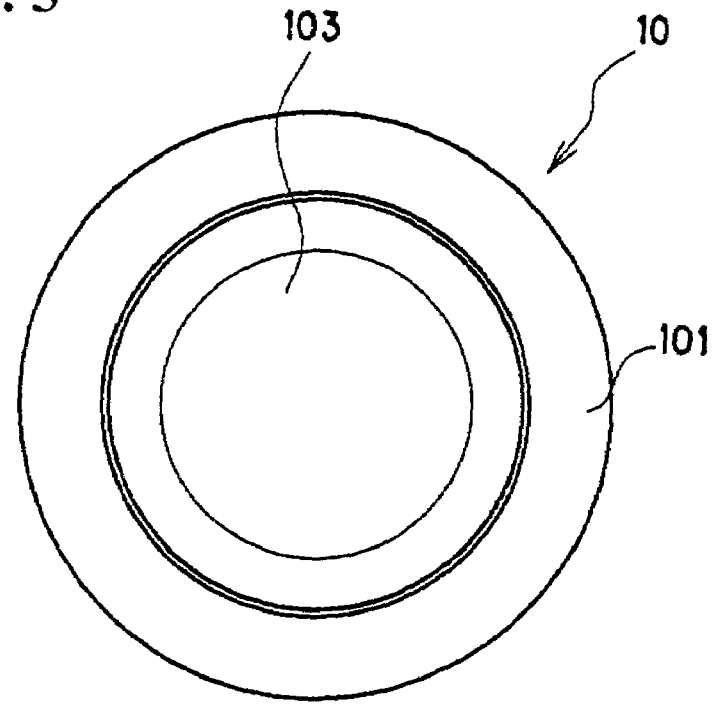
FIG. 5 is a plan view thereof.
Figure 6:
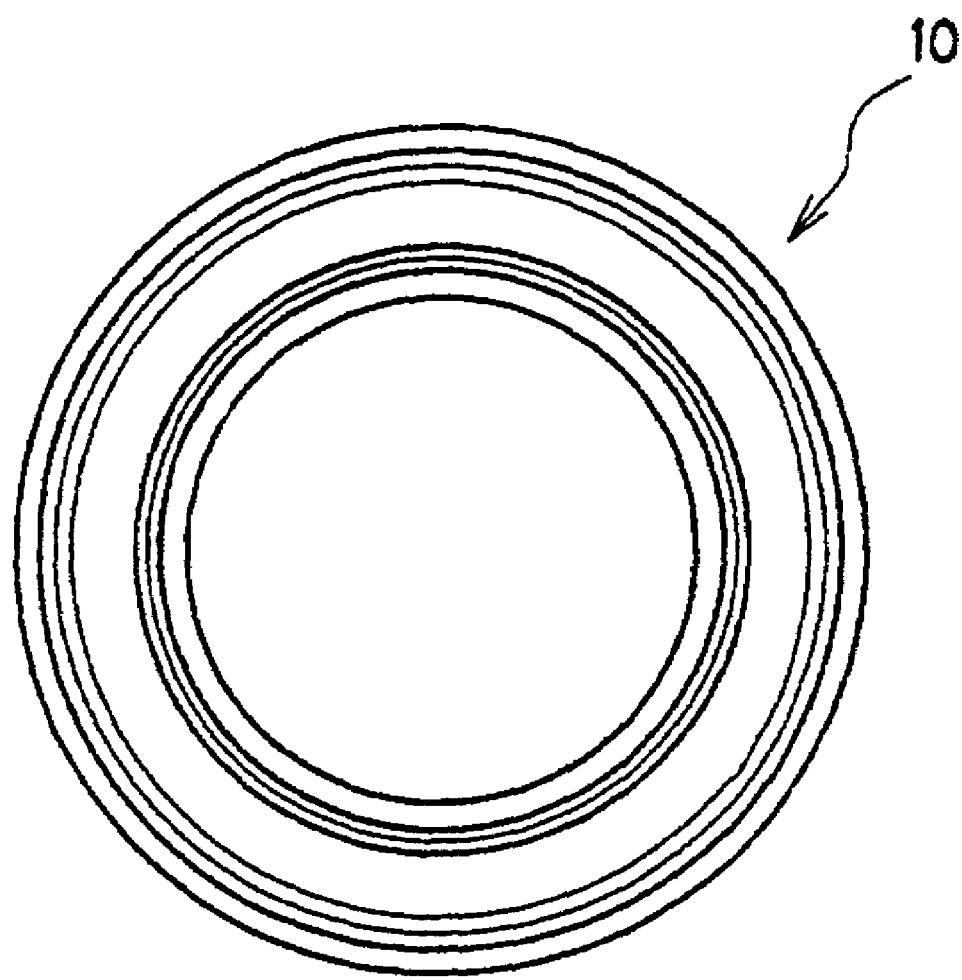
FIG. 6 is a bottom view thereof.
Figure 7:
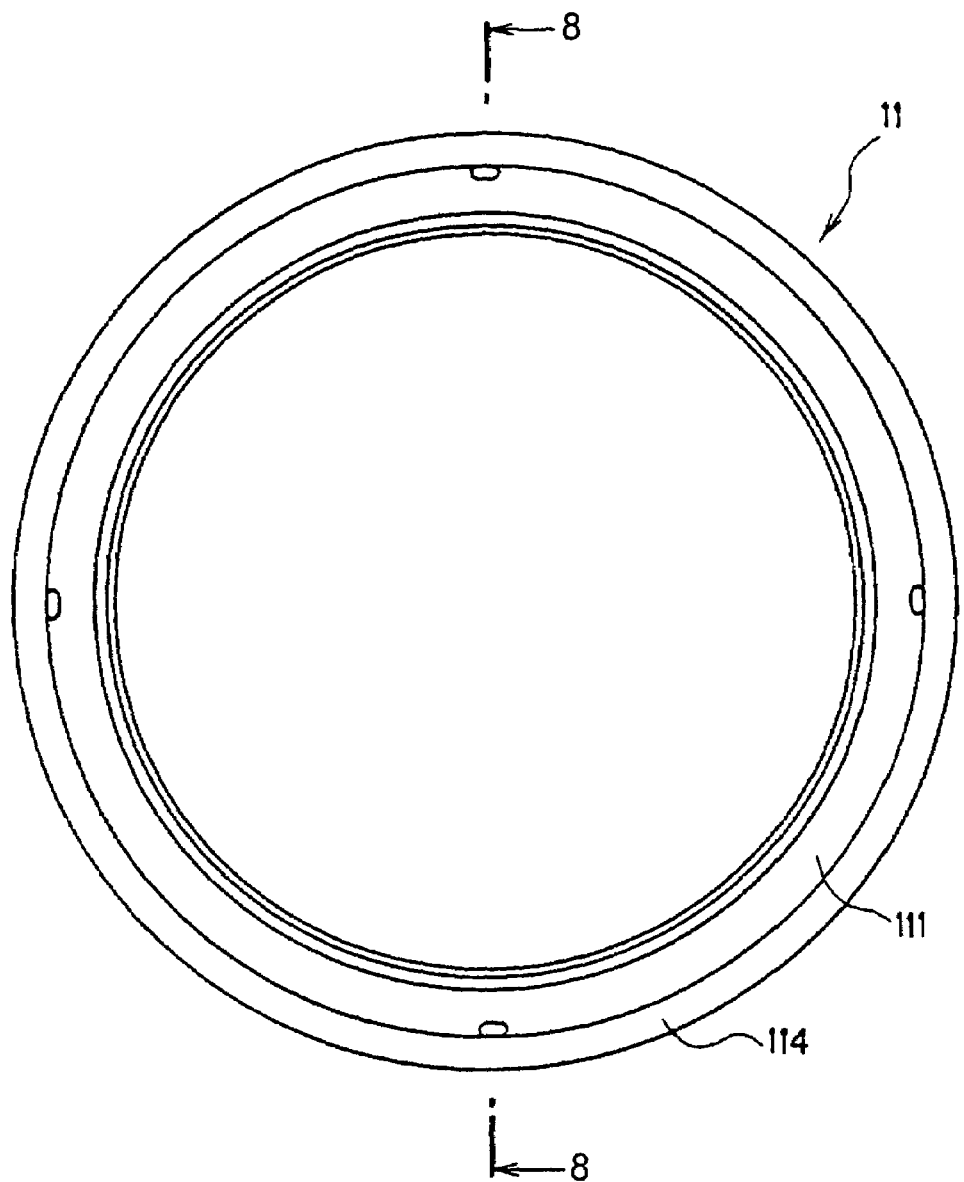
FIG. 7 is a plan view of an elastic seal body.
Figure 8:
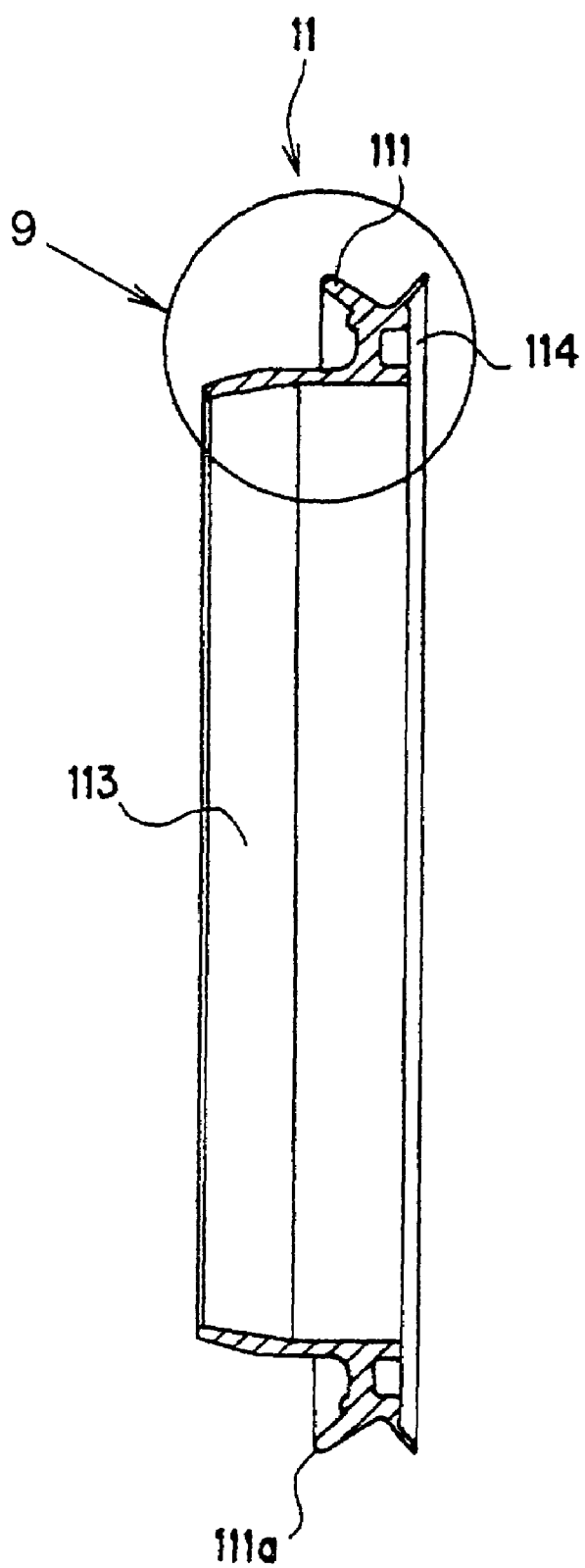
FIG. 8 is a sectional view taken along line 8-8 in FIG. 7.
Figure 9:
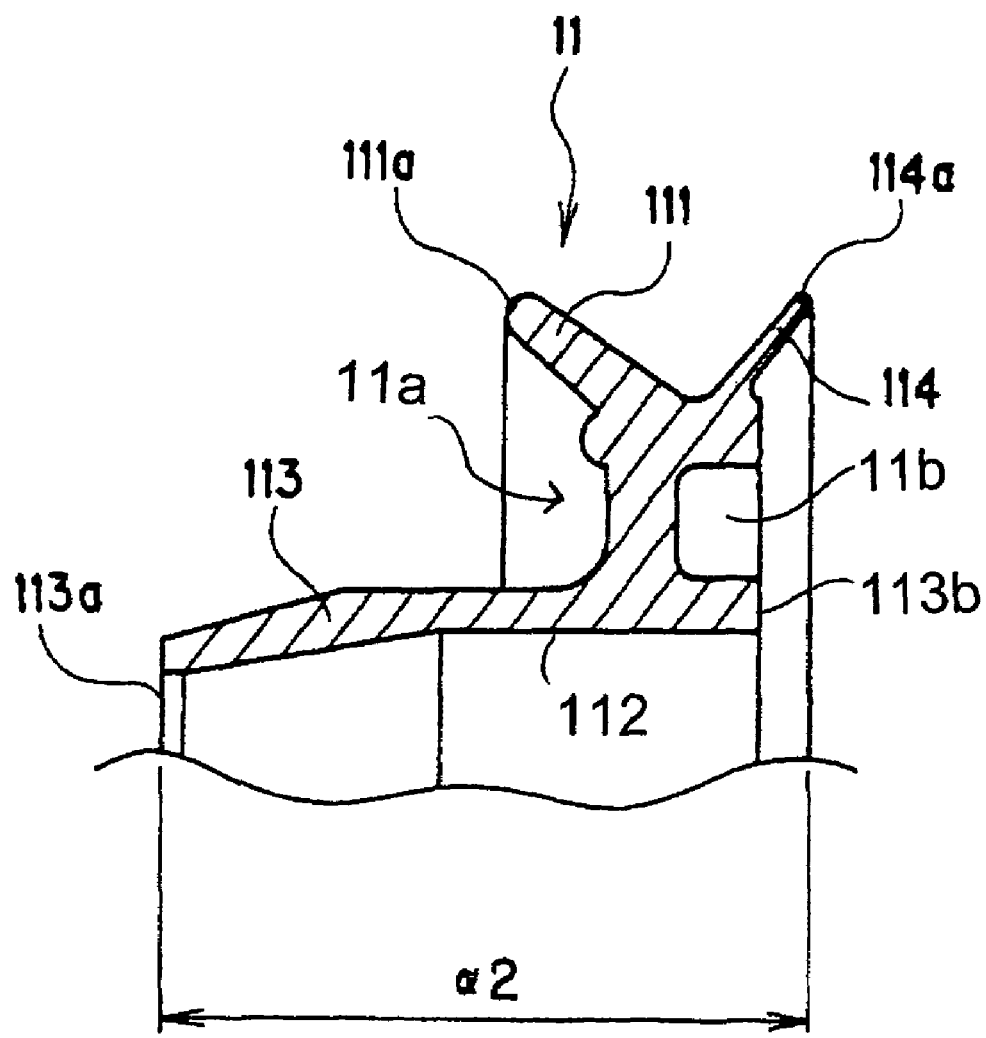
FIG. 9 is an enlarged sectional view of a part shown in FIG. 8.

FIGS. 1 to 9 respectively show an example of a valve body 1 according to an embodiment of the present invention. FIG. 1 shows the valve body 1 in a closed valve state, FIG. 2 shows the valve body 1 in an open valve state, and FIG. 3 shows an essential part of the valve body 1 in the closed valve state. FIGS. 4 to 6 show a valve body main unit 10 constituting the valve body 1, and FIGS. 7 to 9 show an elastic seal body 11 constituting the valve body 1.

Figure 10:
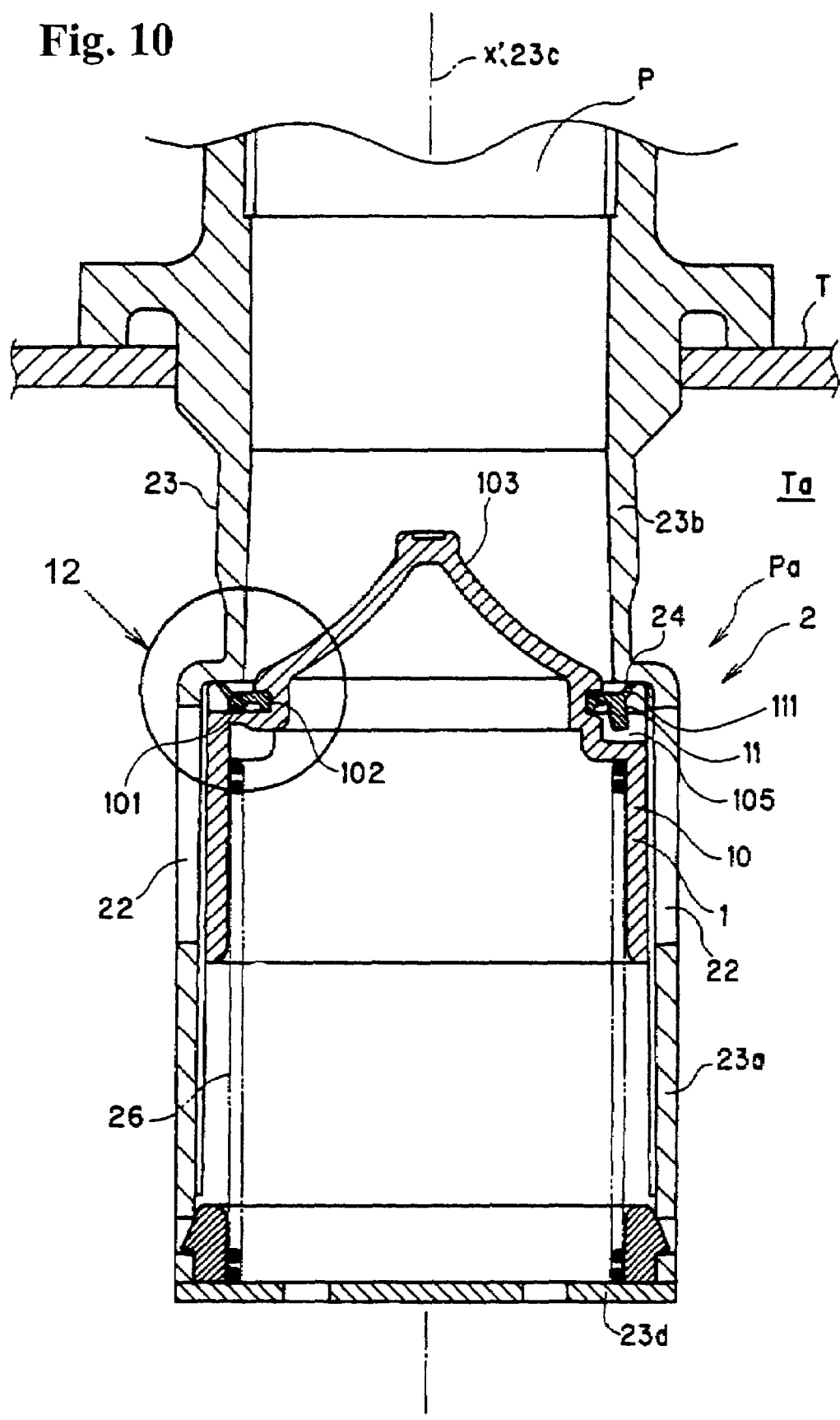
FIG. 10 is a sectional view showing the valve body in use.
Figure 11:
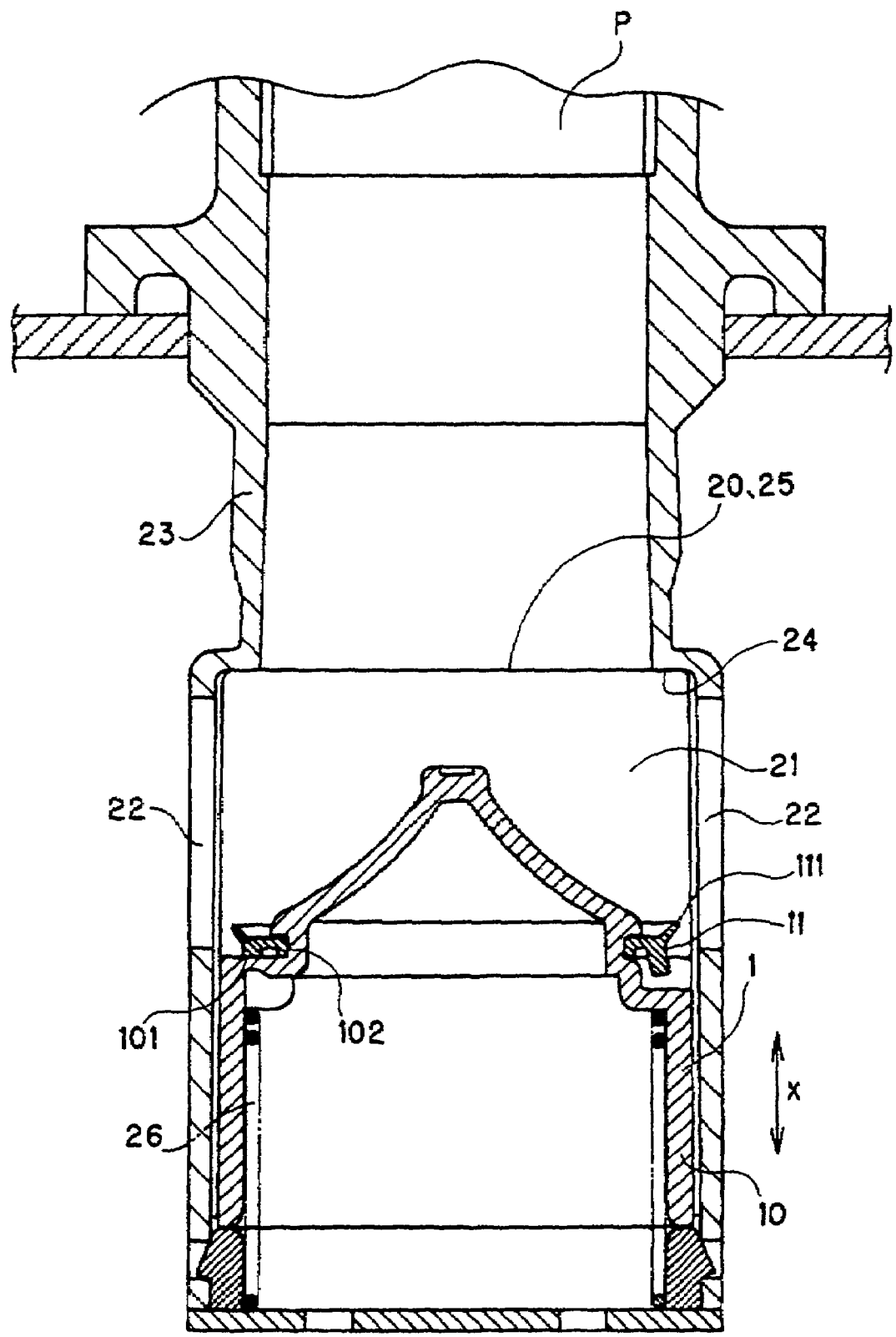
FIG. 11 is a sectional view showing the valve body in use.
Figure 12:
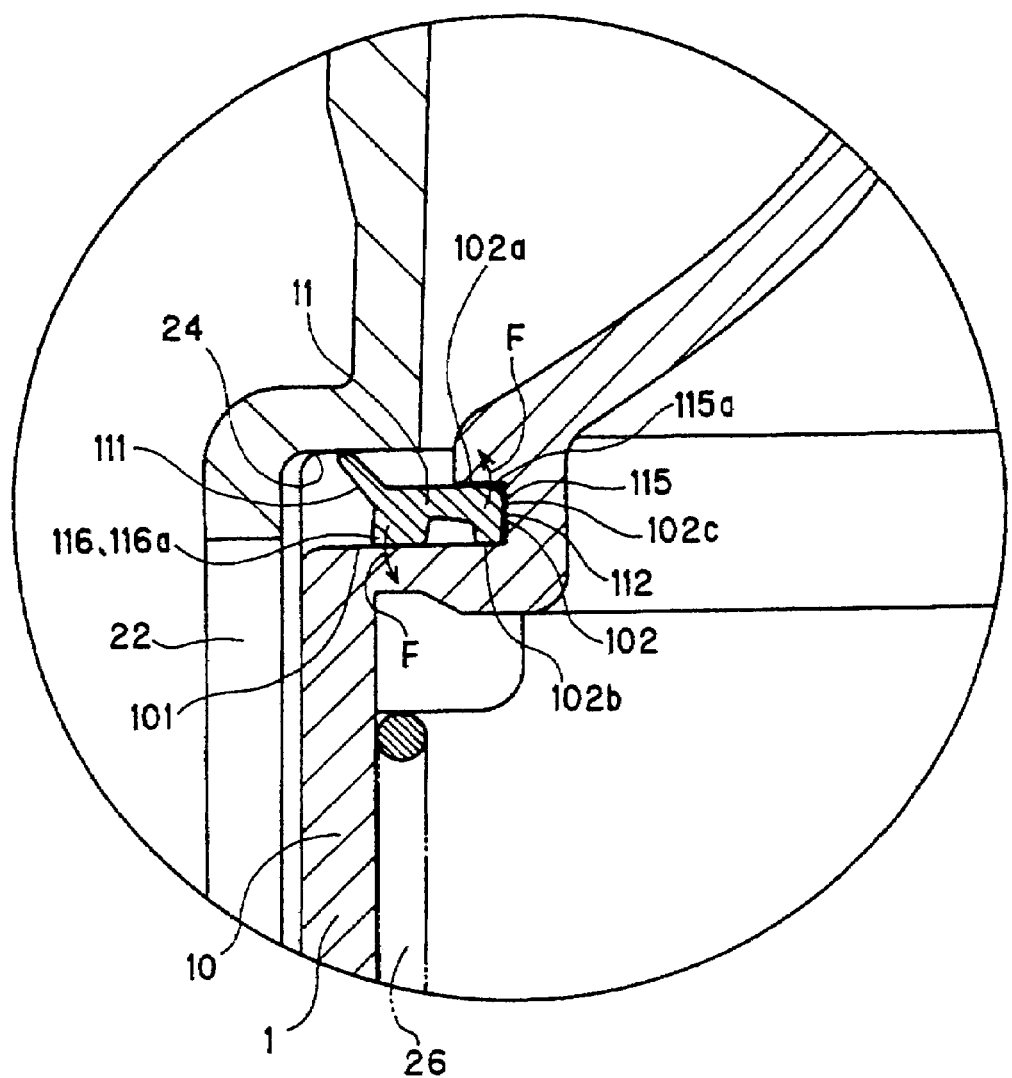
FIG. 12 is an enlarged sectional view of a part shown in FIG. 10.
Figure 13:
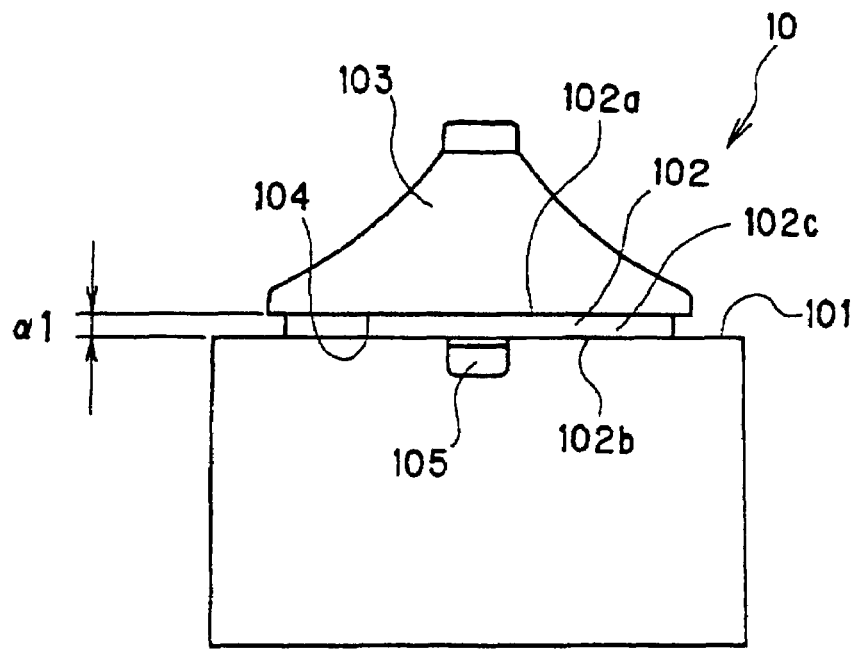
FIG. 13 is a front view of the valve body.
Figure 14:
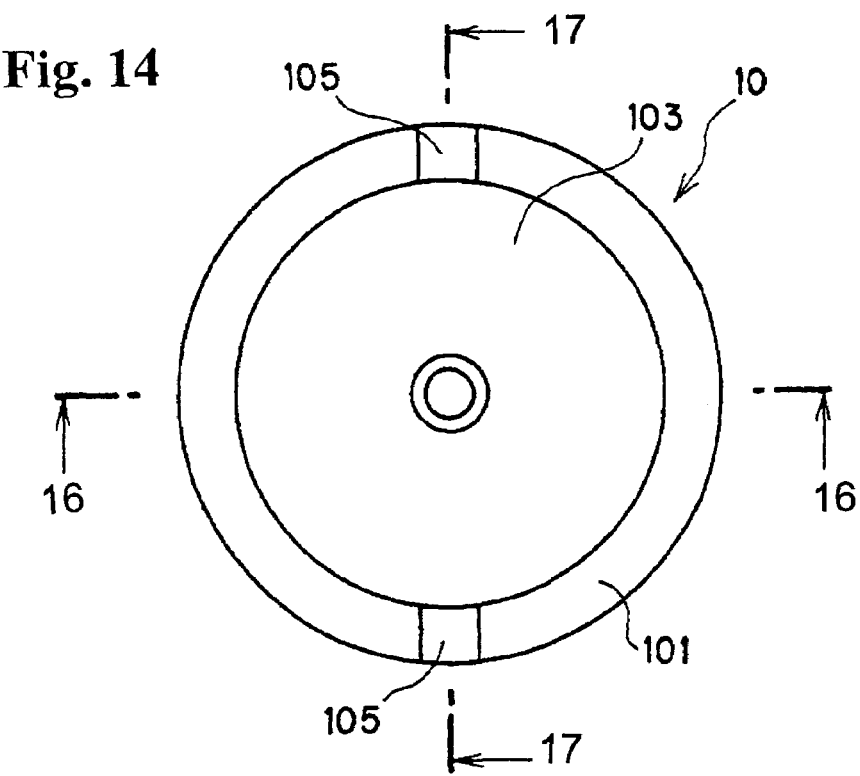
FIG. 14 is a plan view thereof.
Figure 15:
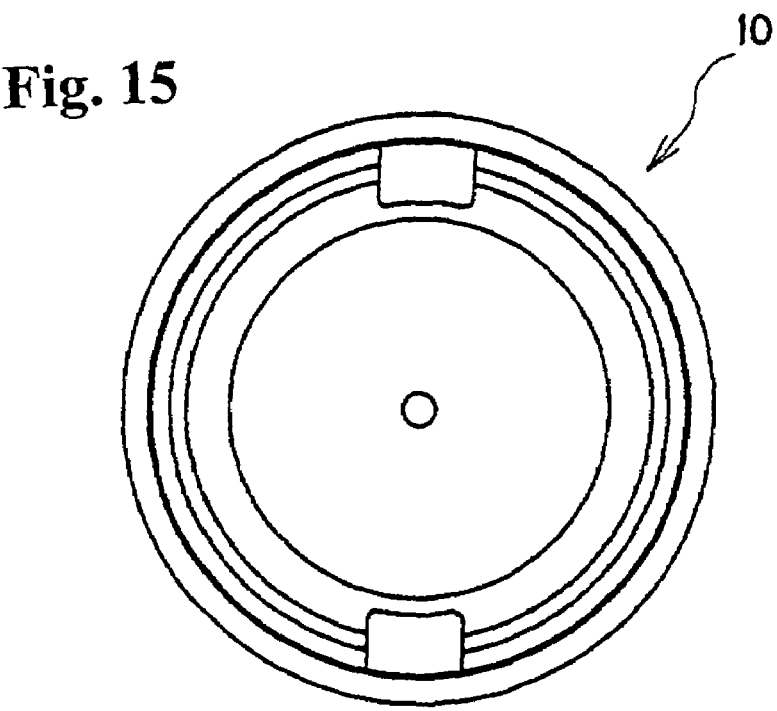
FIG. 15 is a bottom view thereof.
Figure 16:
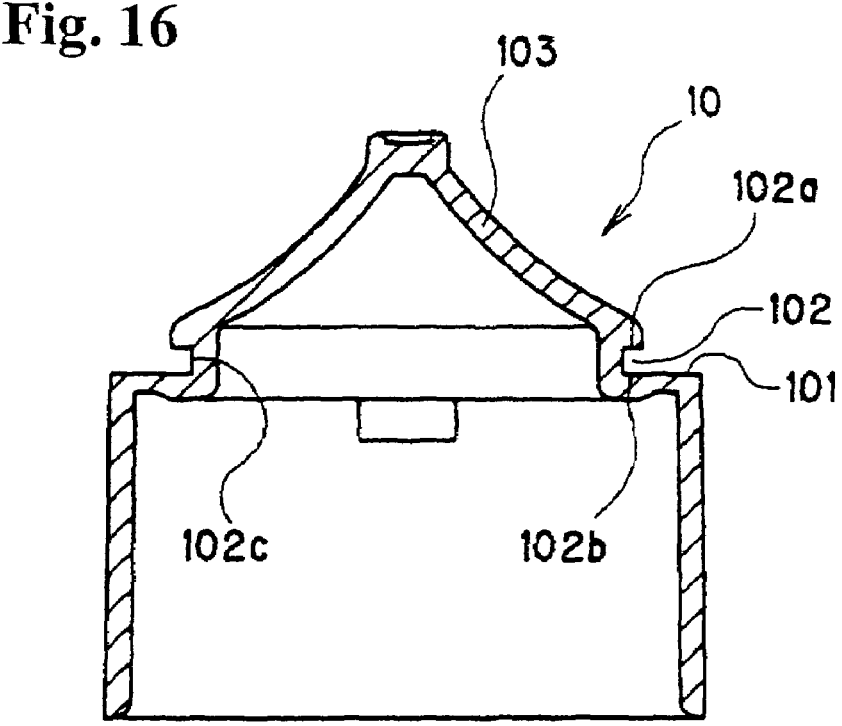
FIG. 16 is a sectional view taken along line 16-16 in FIG. 14.
Figure 17:
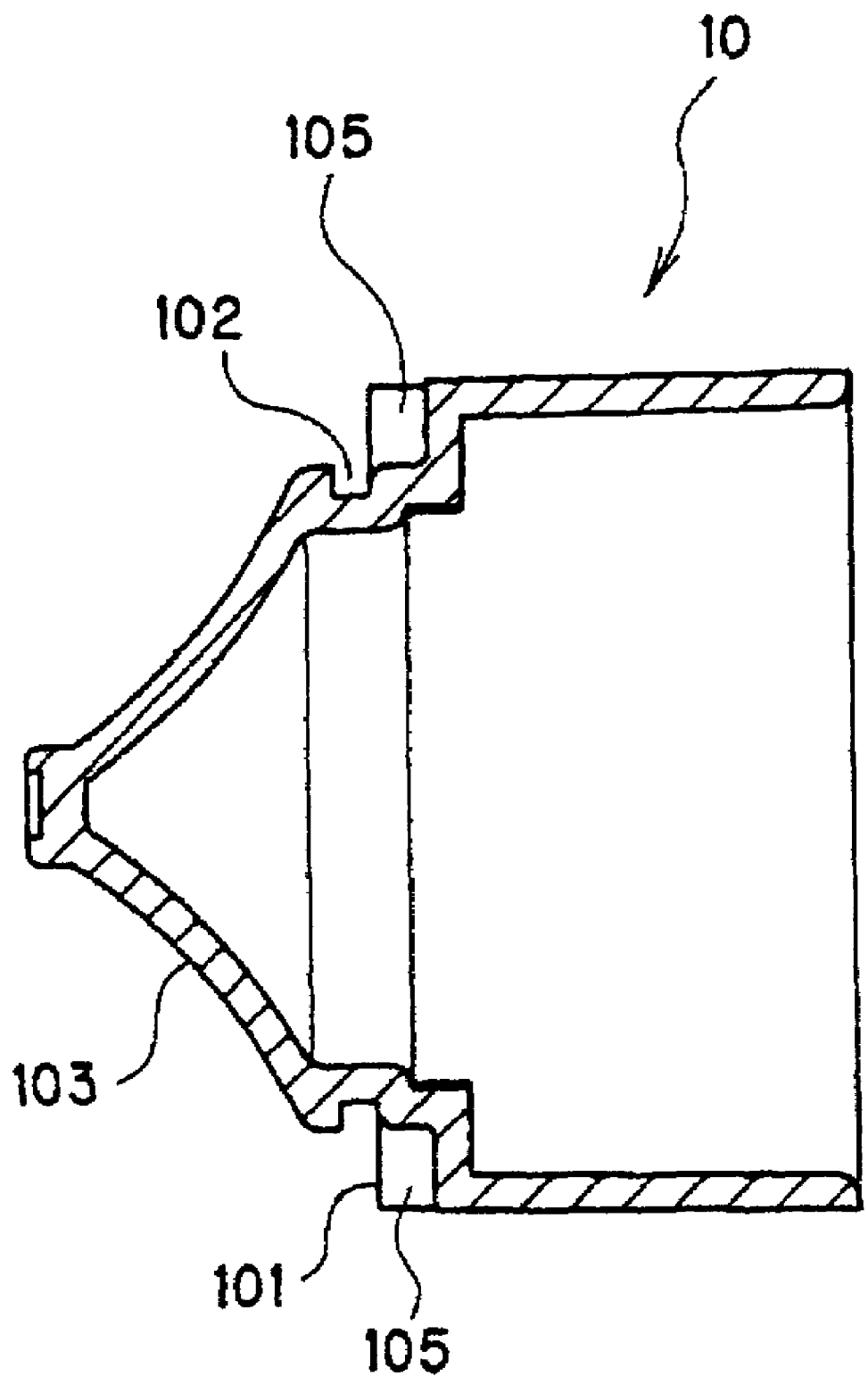
FIG. 17 is a sectional view taken along line 17-17 in FIG. 14.
Figure 18:
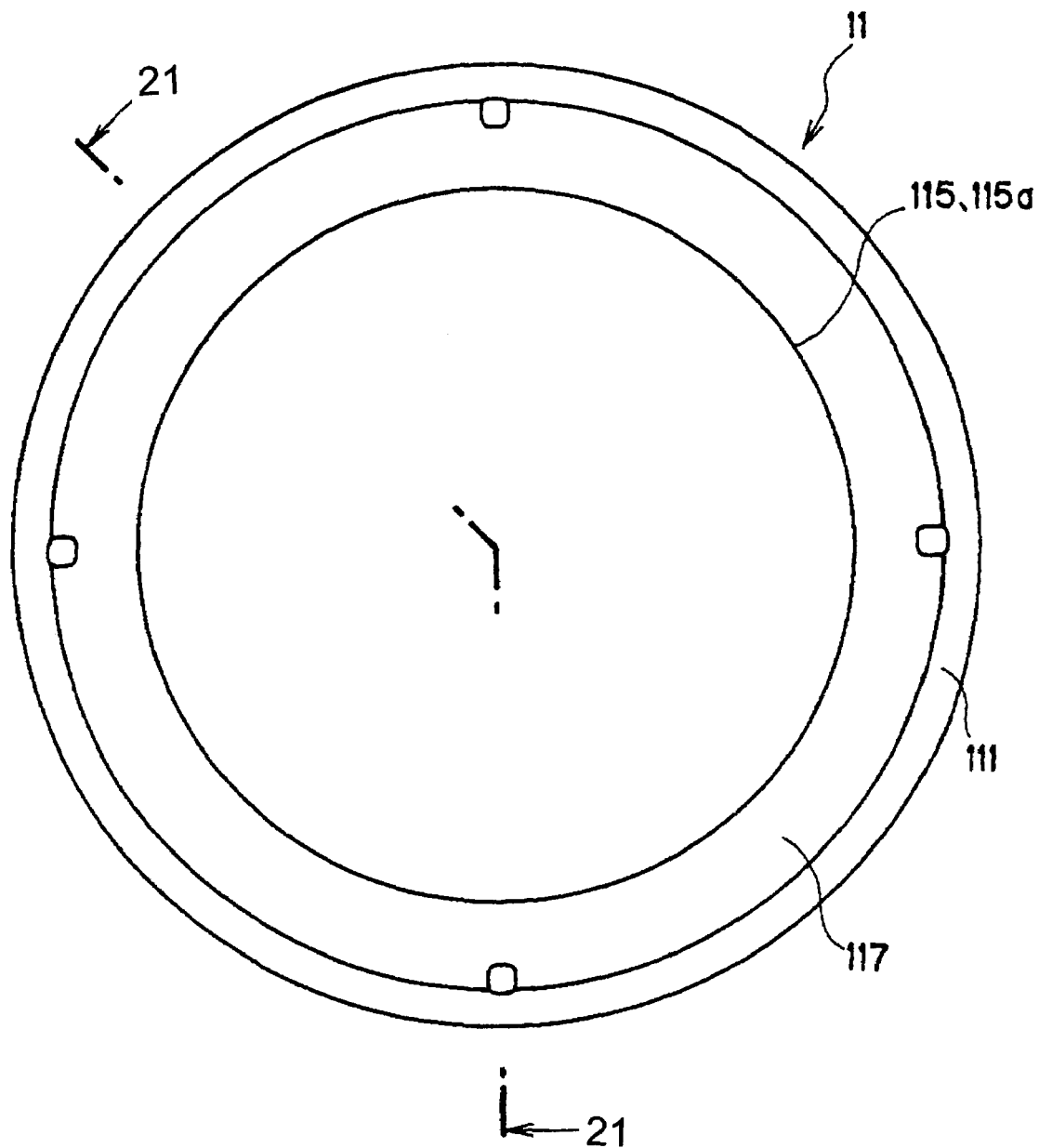
FIG. 18 is a plan view of the elastic seal body.
Figure 19:
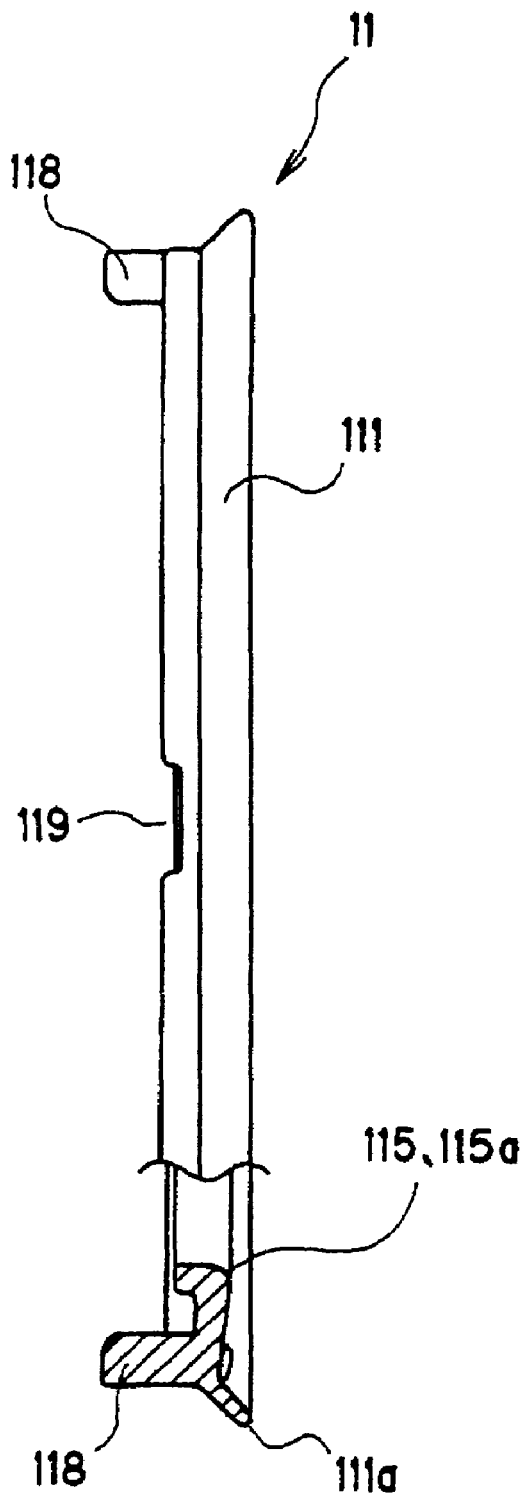
FIG. 19 is a partially exploded side view thereof.
Figure 20:
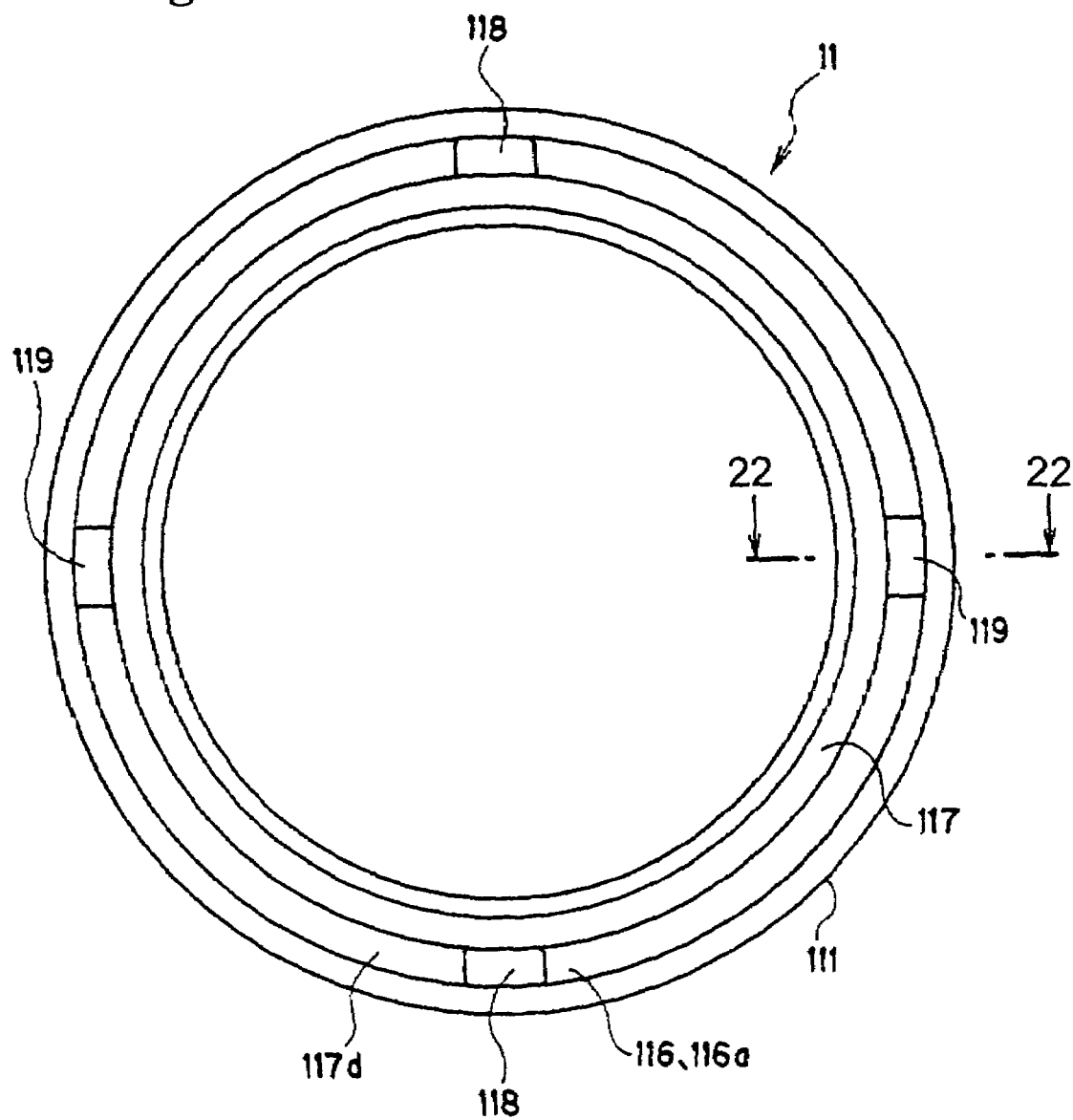
FIG. 20 is a bottom view thereof.
Figure 21:
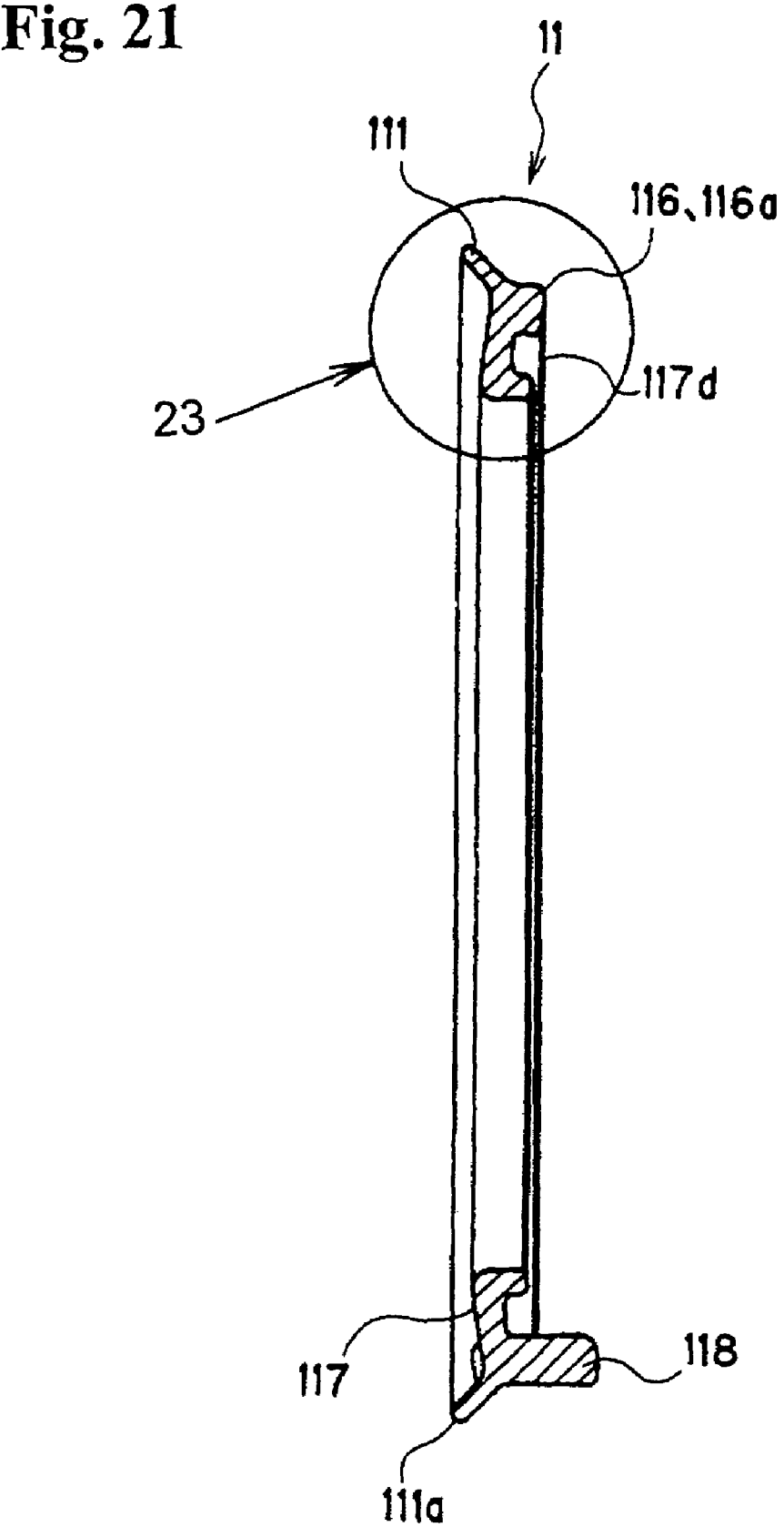
FIG. 21 is a sectional view taken along line 21-21 in FIG. 18.
Figure 22:
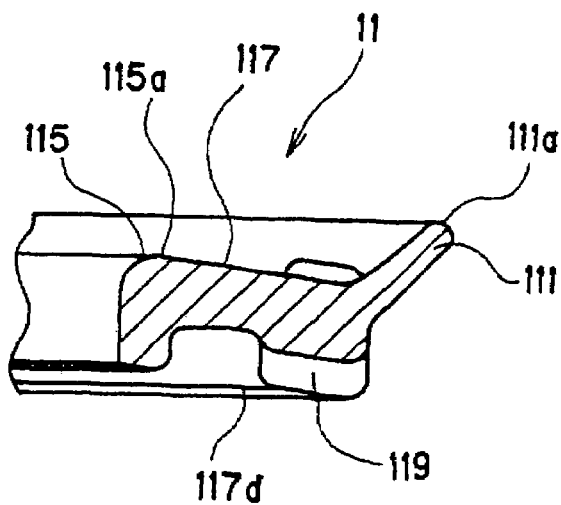
FIG. 22 is a sectional view taken along line 22-22 in FIG. 20.
Figure 23:
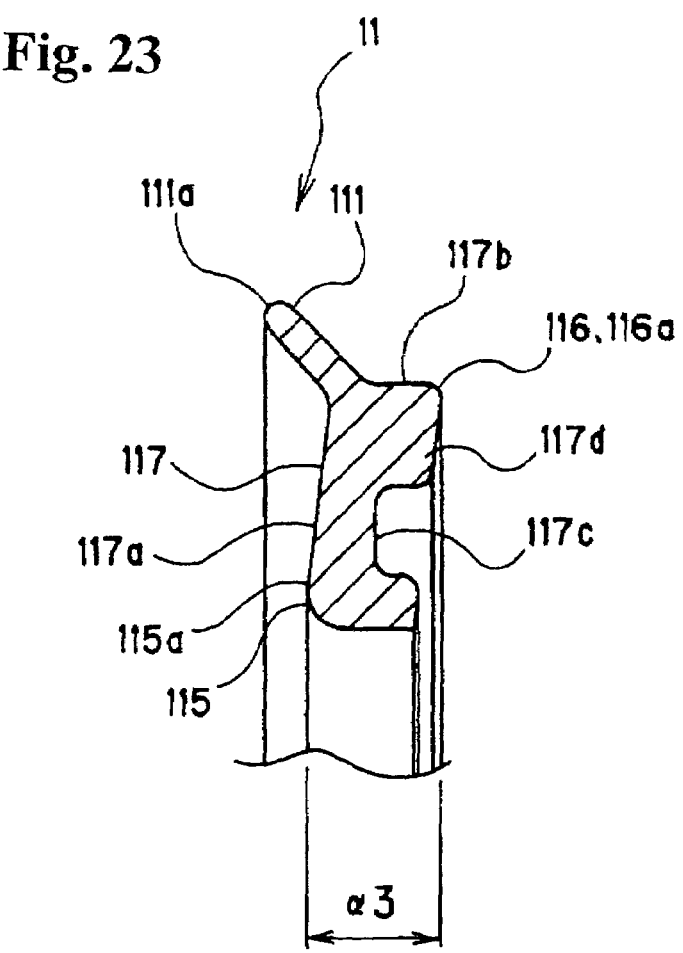
FIG. 23 is a sectional view taken along line 23-23 in FIG. 21.

FIGS. 10 to 23 respectively show another example of the valve body 1. FIG. 10 shows the valve body 1 in the closed valve state, FIG. 11 shows the valve body 1 in the open valve state, and FIG. 12 shows an essential part of the valve body 1 in the closed valve state. FIGS. 13 to 17 show the valve body main unit 10 constituting the valve body 1, and FIGS. 18 to 23 show the elastic seal body 11 constituting the valve body 1.

According to the embodiment, the valve body 1 for the backflow prevention valve 2 is used in the backflow prevention valve 2 provided at a terminal end part Pa of a fuel supply path P for delivering fuel into a fuel tank T. The valve body 1 functions so that during delivery of fuel from the fuel supply path P, the valve is opened by a flow pressure of fuel to allow fuel to flow into the fuel tank T, and during non-delivery of fuel, the valve is closed to block fuel inside the fuel tank T from flowing back into the fuel supply path P.

The backflow prevention valve 2 typically is disposed at a connecting portion between the fuel tank T and the fuel supply path P. The fuel supply path P typically is formed of a pipe body, and delivers fuel supplied by a fuel supply gun or the like inserted on a front end side thereof into inside Ta of the fuel tank from the terminal end part Pa. Such a backflow prevention valve 2 has a valve chamber 21 communicating with the fuel supply path P and the valve body 1 urged so as to close the communicating part 20 from a side of the fuel tank T inside the valve chamber 21. The valve chamber 21 is provided with an outflow part 22 communicating with the fuel tank inside Ta. Accordingly, during delivery of the fuel, the valve body 1 is pushed inwardly to open against the flow pressure of the delivered fuel, and fuel flowing into the valve chamber 21 from the communicating part 20 flows into the fuel tank inside Ta through the outflow part 22. During non-delivery of fuel, the valve body 1 closes the communicating part 20 by the force, and fuel in the fuel tank inside Ta is prevented from flowing back to the fuel supply path P.

In the illustrated example, a cylindrical unit 23 having the valve chamber 21 and the valve body 1 disposed in the valve chamber 21 is connected to a pipe body constituting a main part of the fuel supply path P. Accordingly, the backflow prevention valve 2 is installed on the terminal end part Pa of the fuel supply path P.

The cylindrical unit 23 has a valve chamber forming part 23a having a large inner diameter and an opening to serve as the inflow part 22 on a side part thereof, and a connection cylinder part 23b connected to the pipe body and having an inner diameter smaller than that of the valve chamber forming part 23a. A difference in the inner diameters of the two parts 23a and 23b forms a circular valve seat surface 24 facing the valve chamber 21 at a connecting portion of the two parts 23a and 23b. An interior of the circular valve seat surface 24, that is, a place surrounded by the circular valve seat surface 24, becomes the inflow port 25 for supplying fuel into the valve chamber 21. When the valve is open, fuel flows into the valve chamber 21 through the inflow port 25, and flows into the fuel tank inside Ta through the outflow part 22. The circular valve seat surface 24 has a surface substantially perpendicular to a cylinder axis 23c of the cylindrical unit 23. A cover body 23d closes a terminal end of the cylindrical unit 23 at a side of the valve chamber 21. In the illustrated example, a compression coil spring 26 with one end pushed against an inner surface of the cover body 23d and the other end pushed against the valve body 1 urges the valve body 1.

The valve body 1 is formed of the valve body main unit 10 and the elastic seal body 11.

The valve body main unit 10 has a circular step surface 101 facing the circular valve seat surface 24 of the valve chamber 21 formed on the terminal end part Pa of the fuel supply path P connected to the fuel tank T, and a circular groove 102 with a groove wall 102b extending from the circular step surface 101. Further, the valve body 1 is always urged in a direction of closing the inflow port 25 surrounded by the circular valve seat surface 24.

In the illustrated example, the valve body main unit 10 has a cylindrical shape having an outer diameter smaller than the inner diameter of the valve chamber forming part 23a of the cylindrical unit 23 and larger than the inner diameter of the connection cylinder part 23b. The valve body main unit 10 has one end closed fluid-tightly and the other end opening. In a state that the closed end faces the connection cylinder part 23b, the valve body main unit 10 is housed inside the valve chamber 21 to be movable along a cylinder axis 23c of the cylindrical unit 23. A head part 103 projects from an outer surface of the closed end of the valve body main unit 10 to form the circular step surface 101 between the head part 103 and an outer edge of the one closed end. When the valve is closed, the head part 103 is inserted into the connection cylinder part 23b from the inflow port 25. A circular chin part 104 is formed on a bottom end of the head part 103 to form a circular groove 102. That is, in the illustrated example, a surface of the circular chin part 104 facing the circular step surface 101 becomes the groove wall 102a of the circular groove 102, and an opposite surface of the circular chin part 104 becomes the groove wall 102b of the circular groove 102 extending from the circular step surface 101. The groove walls 102a and 102b of the circular groove part 102 are arranged to have surfaces intersecting the cylinder axis 23c of the cylindrical unit 23, that is, surfaces intersecting a direction x of movement of the valve body 1. Also, in the illustrated example, it is structured such that in a state in which the other end of the compression coil spring 26 is inserted into the valve body main unit 10 from the open end of the valve body main unit 10, the one end of the spring is pushed against the inner surface of the closed end of the valve body main unit 10. The compression coil spring 26 pushed against in this way urges the valve body 1 in the direction. During delivery of the fuel, the valve body 1 is urged against the force of the compression coil spring 26 by the flow pressure acting on the head part 103 of the valve body main unit 10, and is pushed and moved toward the cover body 23d to open the inflow port 25.

The elastic seal body 11 has a ring shape inserted into the circular groove 102 of the valve body main unit 10, a main part 11a with a groove 11b, and a circular fin-shaped part 111 projecting from an outer perimeter part thereof above the circular step surface 101. The circular fin-shaped part 111 is pushed against the circular valve seat surface 24 by the valve body main unit 10 so as to close the valve, thereby blocking backflow of fuel.

The elastic seal body 11 has an inner diameter smaller than a diameter thereof at a position of the groove bottom 102c of the circular groove 102 of the valve body main unit 10. Accordingly, the elastic seal body 11 is inserted into the circular groove 102 such that an inner perimeter surface 112 closely contacts the groove bottom 102c of the circular groove 102. More specifically, in the illustrated example, the elastic seal body 11 is elastically expanded so that the head part 103 of the valve body main unit 10 passes through inside the elastic seal body 11. Then, the elastic seal body 11 is fitted into a front portion of the circular chin part 104 and inserted into the circular groove 102.

In the embodiment, the elastic seal body 11 is inserted into the circular groove 102 of the valve body main unit 10 to form the valve body 1. Accordingly, it is easy to assemble the valve body 1, which pushes the circular fin-shaped part 111 of the elastic seal body 11 against the circular valve seat surface 24 to close the valve. The elastic seal body 11 is inserted into the circular groove 102 of the valve body main unit 10. Accordingly, it is possible to obtain high seal quality between the elastic seal body 11 and the valve body main unit 10. Further, there is no part that has a possibility of leakage of fuel at other parts of the valve body 1.

In the example shown in FIGS. 1 to 9, the elastic seal body 11 has the short cylindrical part 113 inserted into the circular groove 102 of the valve body main unit 10. The circular fin-shaped part 111 projects from the outer perimeter part of the cylindrical part 113. The elastic seal body 11 also has the circular support fin-shaped part 114 on the side of the circular fin-shaped part 111 opposite to the side facing the circular valve seat surface 24. Further, a length α2 of the elastic seal body 11 between the end 113a of the cylindrical part 113 contacting the groove wall 102a upon inserted and the fin tip 114a of the circular support fin-shaped part 114 along the direction x of movement of the valve body 1 is greater than a length α1 thereof between the groove wall 102a of the circular groove 102 and the circular step surface 101 along the direction x of movement of the valve body 1.

More specifically, in the example, the inner perimeter surface 112 of the ring-shaped elastic seal body 11 is formed of the inner perimeter surface of the cylindrical part 113. The circular fin-shaped part 111 is the outer perimeter surface of the cylindrical part 113, and projects sideways between the one end 113a and the other end 113b. Also, the circular support fin-shaped part 114 is formed on the side of the circular fin-shaped part 111 that is not pushed against the circular valve seat surface 24 when the valve is closed. In the illustrated example, the circular support fin-shaped part 114 projects from a middle of the projecting direction of the circular fin-shaped part 111 toward a side opposite to a side facing the fin tip 111a of the circular fin-shaped part 111.

Accordingly, in the example shown in FIGS. 1 to 9, the elastic seal body 11 inserted into the circular groove 102 of the valve body main unit 10 is assembled to the valve body main unit 10 in a state in which the one cylinder end 113a of the cylindrical part 113 is elastically pushed against the other groove wall 102a of the circular groove 102 and the circular support fin-shaped part 114 is elastically pushed against the circular step surface 101. Accordingly, it is possible to obtain high seal quality with the valve body main unit 10 at the two places elastically pushed against in this manner. The circular support fin-shaped part 114 is situated between the circular fin-shaped part 111 and the circular step surface 101 for supporting the circular fin-shaped part 111, and deforms elastically. Accordingly, even if the circular step surface 101 does not have a high degree of flatness, a small variation in a level of the circular step surface 101 is absorbed by the circular support fin-shaped part 114, so that the fin tip 111*a* of the circular fin-shaped part 111 is pushed against the circular valve seat surface 24 on the same level to an extent possible regardless of a position.

In the example shown in FIGS. 1 to 9, the circular fin-shaped part 111 of the elastic seal body 11 projects in an inclined manner to gradually move away from a central line x' of movement of the valve body 1 toward the fin tip 111*a*.

More specifically, in the illustrated example, the circular fin-shaped part 111 projects from the outer perimeter part of the cylindrical part 113 up to a position of connection with the circular support fin-shaped part 114 in a direction substantially perpendicular to the outer surface of the cylindrical part 113, and projects in an inclined manner from the position of connection in a direction gradually moving away from the outer perimeter surface of the cylindrical part 113 toward the fin tip 111*a*.

Accordingly, when the valve is closed, that is, in a state in which the circular fin-shaped part 111 is pushed against the circular valve seat surface 24, and the inflow port 25 is closed fluid-tightly, and when the internal pressure of the fuel tank T rises and a pressing force from the fuel tank T is applied on the circular fin-shaped part 111, the circular fin-shaped part 111 projects in the direction aligned with a direction parallel to the central line x' of movement of the valve body 1. Accordingly, the circular fin-shaped part 111 does not deform, thereby obtaining high seal quality when the valve is closed.

In the example shown in FIGS. 10 to 23, the elastic seal body 11 has an inside edge part 115 inserted into the circular groove 102 of the valve body main unit 10 and an outside edge part 116 supported on the circular step surface 101. The elastic seal body 11 is formed to project from the outside edge part 116. A length α3 between a corner part 115*a* of the inside edge part 115 contacting the other groove wall 102*a* upon being inserted and a corner part 116*a* of the outside edge part 116 contacting the circular step surface 101 along the direction x of movement of the valve body 1 becomes greater than a length α1 between the other groove wall 102*a* of the circular groove 102 and the circular step surface 101 along the direction x of movement of the valve body 1.

In such an example, the elastic seal body 11 has a base 117 between the inner perimeter surface 112 and the outer perimeter surface 117*b*, and the base 117 has front and back surfaces 117*a* and 117*c* having sizes greater than a thickness thereof. The circular fin-shaped part 111 projects sideways from the front surface 117*a* of the base 117, that is, from a corner where a side not facing the circular step surface 101 and the outer perimeter surface 117*b* contact each other. Also, a circular uplifted part 117*d* is formed on a side of the back surface 117*c* of the base 117 contacting the outer perimeter surface 117*b*. The length α3 between the corner part 116*a* where the circular uplifted part 117*d* contacts the outer perimeter surface 117*b* and the corner part 115*a* where the front surface 117*a* of the base 117 contacts the inner perimeter surface 112 along the direction x of movement of the valve body 1 becomes greater than the length α1 between the other groove wall 102*a* of the circular groove 102 and the circular step surface 101 along the direction x of movement of the valve body 1.

Accordingly, in the example shown in FIGS. 10 to 23, the elastic seal body 11 inserted into the circular groove 102 of the valve body main unit 10 is assembled to the valve body main unit 10 in a state in which the corner part 115*a* of the inside edge part 115 is elastically pushed against the other groove wall 113*b* of the circular groove 102, and the corner part 116*a* of the outside edge part 116 is elastically pushed against the circular step surface 101. Accordingly, in addition to the seal between the inside edge part 115 and the groove bottom 102*c* of the circular groove 102, the seal quality with the valve body main unit 10 is further assured at the two places elastically pushed against in this manner. Also, the elastic seal body 11 inserted into the circular groove 102 in this manner accumulates a recoil force in a direction of pulling the circular fin-shaped part 111 off from the circular valve seat surface 24 (recoil force in the direction shown by the symbol F in FIG. 12) at the corner part 115*a* of the inside edge part 115 and the corner part 116*a* of the outside edge part 116, respectively. When the valve body 1 is pushed inwardly in the direction of opening from the closed state upon supplying fuel, a force is applied to the elastic seal body 11 with the circular fin-shaped part 111 seated in the circular valve seat surface 24 in a direction opposite a direction of the accumulated recoil force. Accordingly, even when the force is applied, the elastic seal body 11 is always positioned at a predetermined position with the accumulated recoil force.

Also, in the example shown in FIGS. 10 to 23, the circular fin-shaped part 111 of the elastic seal body 11 projects in an inclined manner so as to gradually move away from the central line x' of movement of the valve body 1 toward the fin tip 111*a*.

Accordingly, in the example, when the internal pressure on the side of the fuel tank T rises and a pressing force from the side of the fuel tank T is applied on the circular fin-shaped part 111 upon closing the valve, the circular fin-shaped part 111 does not deform to project in a direction parallel to the central line x' of movement of the valve body 1, thereby stably maintaining the seal quality of the closed valve.

In the example shown in FIGS. 10 to 23, projecting places 118 are formed to project from the circular uplifted part 117*d* formed on the back surface 117*c* of the base 117 at both sides in the diameter direction of the elastic seal body 11. The projecting places 118 are inserted into recessed places 105 recessed inwardly in the circular step surface 101 at both sides in the diameter direction of the valve body main unit 10 in a state in which the elastic seal body 111 is inserted into the circular groove 102. Recessed places 119 are formed between the projecting places 118 of the elastic seal body 111 for dividing the circular upright part 117*d*. When the valve body main unit 10 is molded with plastic, the recessed places 119 are positioned on a parting line, so that the elastic seal body 11 is inserted into the valve body main unit 10. Accordingly, even when the valve body main unit 10 has a flash on the outer surface thereof, the flash does not influence the level of the fin tip 111*a* of the circular fin-shaped part 111 of the elastic seal body 11 to the extent possible.

The disclosure of Japanese Patent Application No. 2003-389424, filed on Nov. 19, 2003, is incorporated in the application.

While the invention has been explained with reference to the specific embodiments of the invention, the explanation is illustrative and the invention is limited only by the appended claims.

What is claimed is:

1. A valve body for a backflow prevention valve, comprising:
    a valve body main unit having a circular step surface facing a circular valve seat surface of a valve chamber, and a circular groove with one groove wall extending from the circular step surface, said valve body main unit being always urged in a direction of closing an inflow port surrounded by the circular valve seat surface, and an elastic seal body with a ring shape inserted into the circular groove of the valve body main unit, said elastic seal body having a main portion disposed above the circular step surface, a groove formed in the main portion, and a circular fin-shaped part projecting from an outer perimeter part thereof, said main portion and said circular fin-shaped part directly facing and being pushed against the circular valve seat surface together with the valve body main unit for closing the valve and preventing backflow of fluid.

2. A valve body according to claim 1, wherein said elastic seal body further includes a circular support fin-shaped part formed on a side of the circular fin-shaped part opposite to a side facing the circular valve seat surface.

3. A valve body according to claim 2, wherein said elastic seal body has a size such that a length between one cylinder end of the main portion contacting the other groove wall of the circular groove and a fin tip of the circular support fin-shaped part along a direction of movement of the valve body is greater than a length between the other groove wall and the circular step surface along the direction of movement of the valve body.

4. A valve body according to claim 1, wherein said main portion includes an inside edge part inserted into the circular groove of the valve body main unit and an outside edge part supported on the circular step surface, said circular fin-shaped part projecting from the outside edge part.

5. A valve body according to claim 4, wherein said groove faces the circular step surface and extends between the inside edge part and the outside edge part.

6. A valve body according to claim 1, wherein said circular fin-shaped part of the elastic seal body projects in an inclined state and gradually moves away from a central line of movement of the valve body toward a fin tip thereof.

7. A backflow prevention valve comprising said valve body according to claim 1, and a cylindrical unit including a valve chamber forming part having an opening to serve as an inflow part on a side part thereof, a connection cylinder part having an inner diameter smaller than that of the valve chamber forming part, and said circular valve seat surface between the valve chamber forming part and the connection cylinder part.

8. A backflow prevention valve according to claim 7, wherein said main portion and said fin-shaped part contact the circular valve seat surface in a closed condition.

9. A backflow prevention valve according to claim 8, wherein said circular step surface and the circular valve seat surface are arranged parallel to each other with the outside edge part and the fin-shaped part interposed therebetween.

10. A valve body for a backflow prevention valve, comprising:

a valve body main unit having a circular step surface facing a circular valve seat surface of a valve chamber, and a circular groove with one groove wall extending from the circular step surface, said valve body main unit being always urged in a direction of closing an inflow port surrounded by the circular valve seat surface, and an elastic seal body with a ring shape inserted into the circular groove of the valve body main unit, said elastic seal body having a circular fin-shaped part projecting from an outer perimeter part thereof to be disposed above the circular step surface, an inside edge part inserted into the circular groove of the valve body main unit and an outside edge part supported on the circular step surface, said circular fin-shaped part projecting from the outside edge part and being pushed against the circular valve seat surface together with the valve body main unit for closing the valve and preventing backflow of fluid, wherein said elastic seal body has a size such, that a length between a corner part of the inside edge part contacting the other groove wall of the circular groove and a corner part of the outside edge part contacting the circular step surface along a direction of movement of the valve body becomes greater than a length between the other groove wall and the circular step surface along the direction of movement of the valve body.

* * * * *